(12) United States Patent
Yanagisawa

(10) Patent No.: US 6,293,492 B1
(45) Date of Patent: Sep. 25, 2001

(54) COAXIAL TWIN-ROTOR TYPE HELICOPTER

(75) Inventor: Gennai Yanagisawa, Nagano-ken (JP)

(73) Assignee: Engineering System Co., Ltd., Nagano-ken (JP)

( * ) Notice: Subject to any disclaimer, the term of this patent is extended or adjusted under 35 U.S.C. 154(b) by 0 days.

(21) Appl. No.: 09/387,493

(22) Filed: Sep. 1, 1999

(30) Foreign Application Priority Data

Sep. 2, 1998 (JP) .................................................. 10-247657
Jan. 8, 1999 (JP) .................................................. 11-002480

(51) Int. Cl.[7] .................................................. B64C 27/52
(52) U.S. Cl. .................................... 244/17.25; 244/17.23; 244/4 A
(58) Field of Search ............................. 244/17.11, 17.23, 244/4 A, 17.25, 17.19; 416/88, 89, 128, 129, 87

(56) References Cited

U.S. PATENT DOCUMENTS

| | | | |
|---|---|---|---|
| 2,156,334 | * | 5/1939 | De Bothezat . |
| 2,456,485 | * | 12/1948 | Bendix . |
| 2,461,347 | * | 2/1949 | Pentecost . |
| 2,954,186 | * | 9/1960 | Bibrey . |
| 3,029,047 | * | 4/1962 | Jacobsen et al. . |
| 3,126,966 | * | 3/1964 | Agamian . |
| 3,669,564 | * | 6/1972 | Garfinkle . |
| 3,814,351 | * | 6/1974 | Bielawa . |
| 3,921,939 | * | 11/1975 | Garfinkle . |
| 4,071,206 | * | 1/1978 | Magill . |
| 4,912,999 | * | 4/1990 | Franks et al. . |

* cited by examiner

Primary Examiner—Charles T. Jordan
Assistant Examiner—Tren Dinh
(74) Attorney, Agent, or Firm—Burns, Doane, Swecker & Mathis, L.L.P.

(57) ABSTRACT

A one-man helicopter 1 in which a drive transmission 10 that transmits driving force to upper and lower rotors 5 and 6 comprises first and second planet gear mechanisms 100 and 200 provided with a common carrier 104. When the common carrier 104 is rotated by a motor 301, a differential motion is generated between the two planet gear mechanisms. This results in the rotors being rotated at different velocities, which can be used to control yaw. A fore-and-aft swing mechanism 400 and right-and-left swing mechanism 500 depend from the lower end of a vertical shaft 41 on which the rotors are supported. Moving a stick 8 forward or backward, or to either side, tilts the vertical shaft 41 in the same direction. When the stick 8 is not subjected to a controlling force, the vertical shaft 41 reverts automatically to its original vertical state. This configuration makes it possible to realize a coaxial twin-rotor type helicopter having a compact, structurally simple control mechanism.

4 Claims, 5 Drawing Sheets

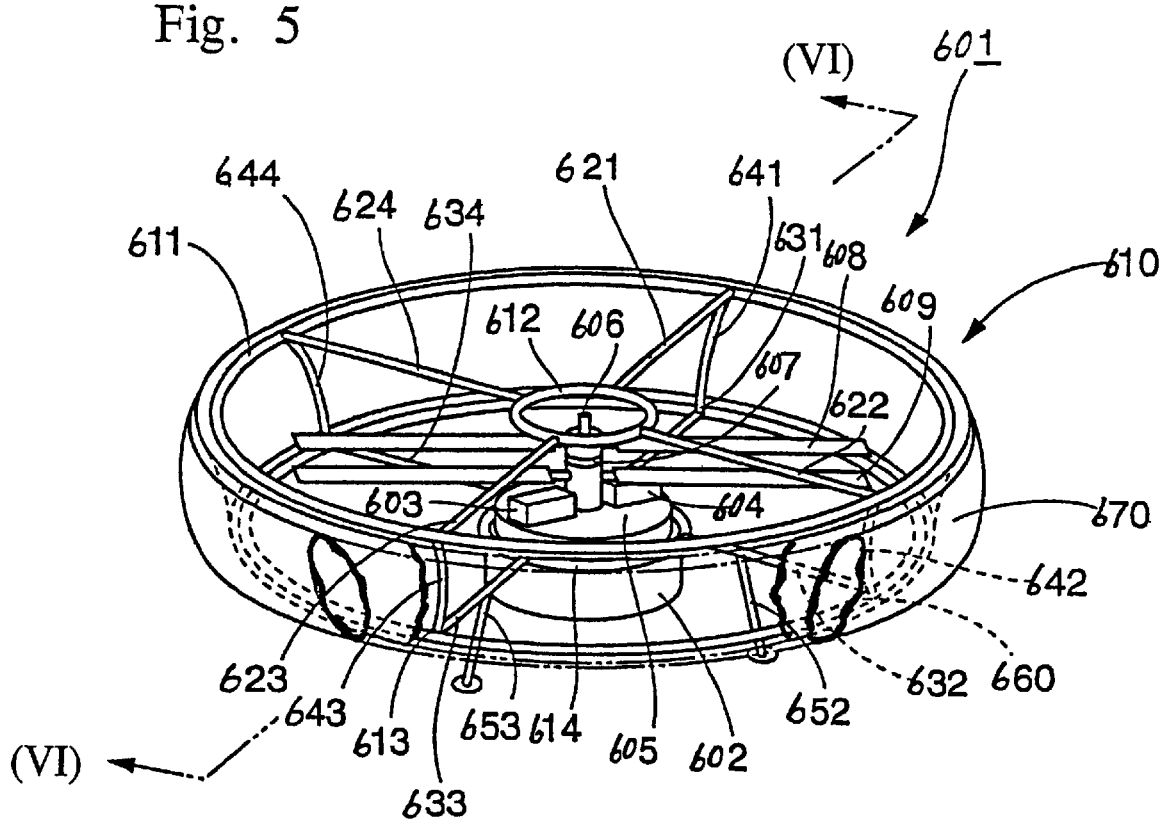

COAXIAL TWIN-ROTOR TYPE HELICOPTER

BACKGROUND OF THE INVENTION

1. Field of the Invention

This invention relates to a coaxial twin-rotor type helicopter in which upper and lower coaxial rotors are rotated in opposite directions. More particularly, this invention relates to a coaxial twin-rotor type helicopter having a compact, simple control mechanism. The invention also relates to a coaxial rotor type helicopter in which the rotors are covered by a protective frame.

2. Prior Art Description

Various helicopter structures are known. To realize a small, one-man helicopter that is easy to use, the present inventors are developing a coaxial twin-rotor type helicopter in which thrust and lift are obtained by counterrotating a lower and an upper rotor provided on the same axis. In a twin-rotor helicopter, torque is counteracted by having upper and lower rotors of the same shape rotate in opposite directions. As such a configuration eliminates the need for a tail rotor, and therefore enables the overall dimensions to be reduced, it is a suitable basic configuration for a small, one-man helicopter. The attitude and the direction of the helicopter are controlled basically by tilting the tips of the rotor blades with respect to the horizontal plane, and by controlling the attack angle of the rotor blades.

However, the control mechanisms of such conventional coaxial twin-rotor type helicopters are complex and require a large installation space, making them unsuitable for the type of small helicopter the present inventors are developing. Moreover, when this type of helicopter is used for tasks such as spraying agricultural chemicals, unlike a large helicopter, it is generally flown at a low altitude, and when operated at low altitude, it is usually used in hovering mode. This means there is a high possibility of people working on the ground being struck by the rotors. There is also a high likelihood of the rotors hitting and breaking electric power lines.

An object of this invention is therefore to provide a coaxial twin-rotor type helicopter having a compact, simple control mechanism.

Another object of the invention is to provide a coaxial twin-rotor type helicopter having a compact, simple yaw control mechanism.

Another object of the invention is to provide a safe coaxial twin-rotor type helicopter having rotors that do not hit people or electric power lines or the like.

SUMMARY OF THE INVENTION

The invention achieves the above and other objects by providing a coaxial twin-rotor type helicopter in which an upper rotor and a lower rotor disposed on the same axis are rotated in opposite directions, said helicopter comprising: an airframe, a vertical shaft that rotatably supports the rotors, and a control mechanism that, with respect to a gravitational force direction, can tilt the vertical shaft backward and forward and to either side to thereby tilt tips of blades of the rotors; said control mechanism comprising a first swing member that depends from a lower end portion of the vertical shaft so as to be freely swingable backward and forward and to either side about a swing center point on a center axis of the vertical shaft, a second swing member that depends from the first swing member so as to be freely swingable about the swing center point in a direction at right-angles to the swinging direction of the first swing member, and a control stick that can swing the vertical shaft backward and forward and to either side.

When the helicopter thus configured is in the air, the airframe depends, via the first and second swing members, from the vertical frame to which the rotors are attached. In this state, the airframe can be tilted forward, backward or to either side, with respect to the direction of gravitational force, about a center point on the vertical shaft by moving the control stick in the forward, backward or sideways direction concerned. This tilts the rotor face, thereby enabling the lift direction to be changed. When the control stick is released, the force of gravity causes the vertical stick to return automatically to the vertical.

The coaxial twin-rotor type helicopter of this invention includes a drive transmission mechanism to rotate the twin rotors. The drive transmission mechanism includes first and second planet gear mechanisms, and a drive pinion that rotates internal gears in the first and second planet gear mechanisms in opposite directions at uniform velocity. The first and second planet gear mechanisms are provided with a common carrier. The sun gear of the first planet gear mechanism is connected to rotate integrally with the rotor shaft of the upper rotor, and the sun gear of the second planet gear mechanism is connected to rotate integrally with the rotor shaft of the lower rotor.

The coaxial twin-rotor type helicopter of the invention includes a yaw control mechanism to control airframe yaw. The yaw control mechanism is provided with a differential rotation generator that rotates the common carrier of the first and second planet gear mechanisms. The differential rotation generator comprises a motor, an outer gear-wheel formed on the outer face of the common carrier, and a reduction gear-train between the motor output shaft and the outer gear-wheel. When the motor is not in operation, the upper and lower rotor shafts are driven at a uniform velocity in opposite directions via the first and second planet gear mechanisms. As a result, no torque is generated about the vertical axis of the airframe, so the airframe continues to point in the same direction.

When the motor is operated, the rotational force of the motor is transmitted via the reduction gear-train to the common carrier of the first and second planet gear mechanisms, thereby rotating the common carrier in one direction. This sets up a differential motion between the sun gears of the planet gear mechanisms, producing a difference between the rotational velocities of the two rotors. This generates a turning moment about the vertical axis of the airframe, changing the direction the airframe faces.

In a preferred embodiment of the invention, the rotors of the coaxial twin-rotor type helicopter have a protective frame disposed concentrically over the outer periphery of the rotors. The protective frame serves to prevent the rotors from coming into direct contact with persons working on the ground, and to prevent electric power lines and the like from being cut by the rotors. To ensure that the rotors are not able to come into contact with people or electric power lines, it is preferable for the rotors to be covered by a cylindrical protective net on the periphery of the protective frame. In the event that the protective frame does hit a person or the like, it is also preferable for the periphery of the protective frame to be covered with an air tube to protect the person from the shock of the impact.

Further features of the invention, its nature and various advantages will be more apparent from the accompanying drawings and following detailed description of the invention.

BRIEF DESCRIPTION OF THE DRAWINGS

FIG. 5 is a general view of the arrangement of a radio-controlled coaxial twin-rotor type helicopter that is a second embodiment of the invention.

FIG. 6 is a cross-sectional view along line VI—VI of FIG. 4.

DETAILED DESCRIPTION OF THE PREFERRED EMBODIMENT

Embodiments of the coaxial twin-rotor type helicopter of the invention adapted to one-man use will now be described with reference to the drawings.

First Embodiment (Overall Structure)

Figure 1:
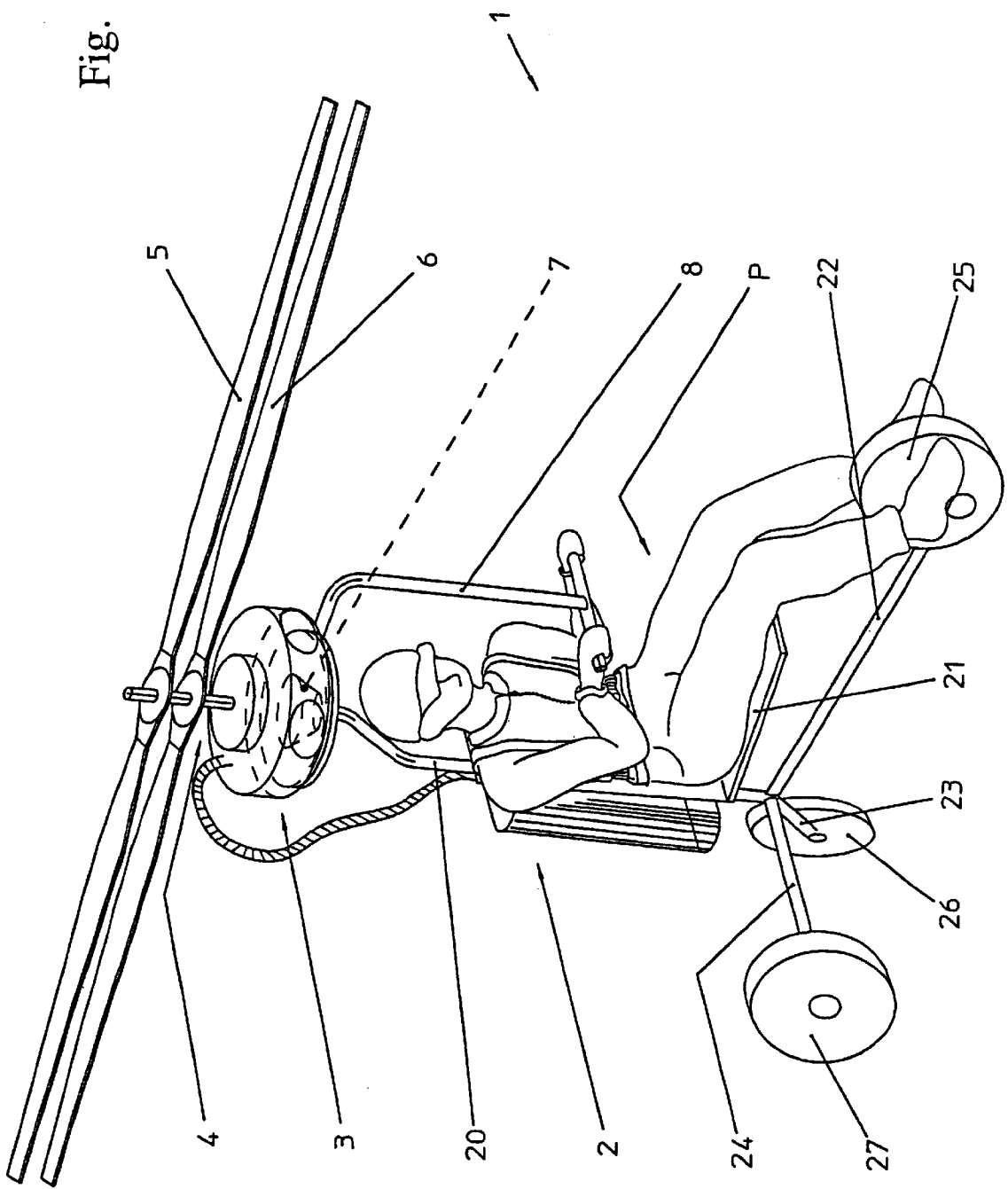
FIG. 1 is a general view of the arrangement of a one-man helicopter that is a first embodiment of the invention.

FIG. 1 is a general view of the arrangement of a one-man coaxial twin-rotor type helicopter according to a first embodiment of the invention. With reference to the drawing, a helicopter 1 comprises a pipe airframe 2, a round muffler 3 attached horizontally at the upper end of the airframe, and a drive unit 4, also attached to the upper end of the airframe 2. Upper and lower rotors 5 and 6 having the same shape are rotated in opposite directions by the drive unit 4. A pipe-frame 20 constituting the airframe 2 has a seat 21, three legs 22 to 24 formed at the lower part, and three wheels 25 to 27 rotatably affixed to the lower end of the respective legs. The drive unit 4 is provided with four engines 42 (engines 42A to 42D, shown in FIG. 4), although the engines are not shown in FIG. 1.

The drive unit 4 and airframe 2 are connected to each other via a control unit 7. Extending down from the control unit 7 is a control stick 8, formed in the shape of an inverted L, to allow the helicopter 1 to be controlled by a pilot P sitting on the seat 21. It is to be understood that the control stick 8 may instead be U-shaped, or extend up from below like a conventional control stick arrangement.

(Drive Unit)

Figure 2:
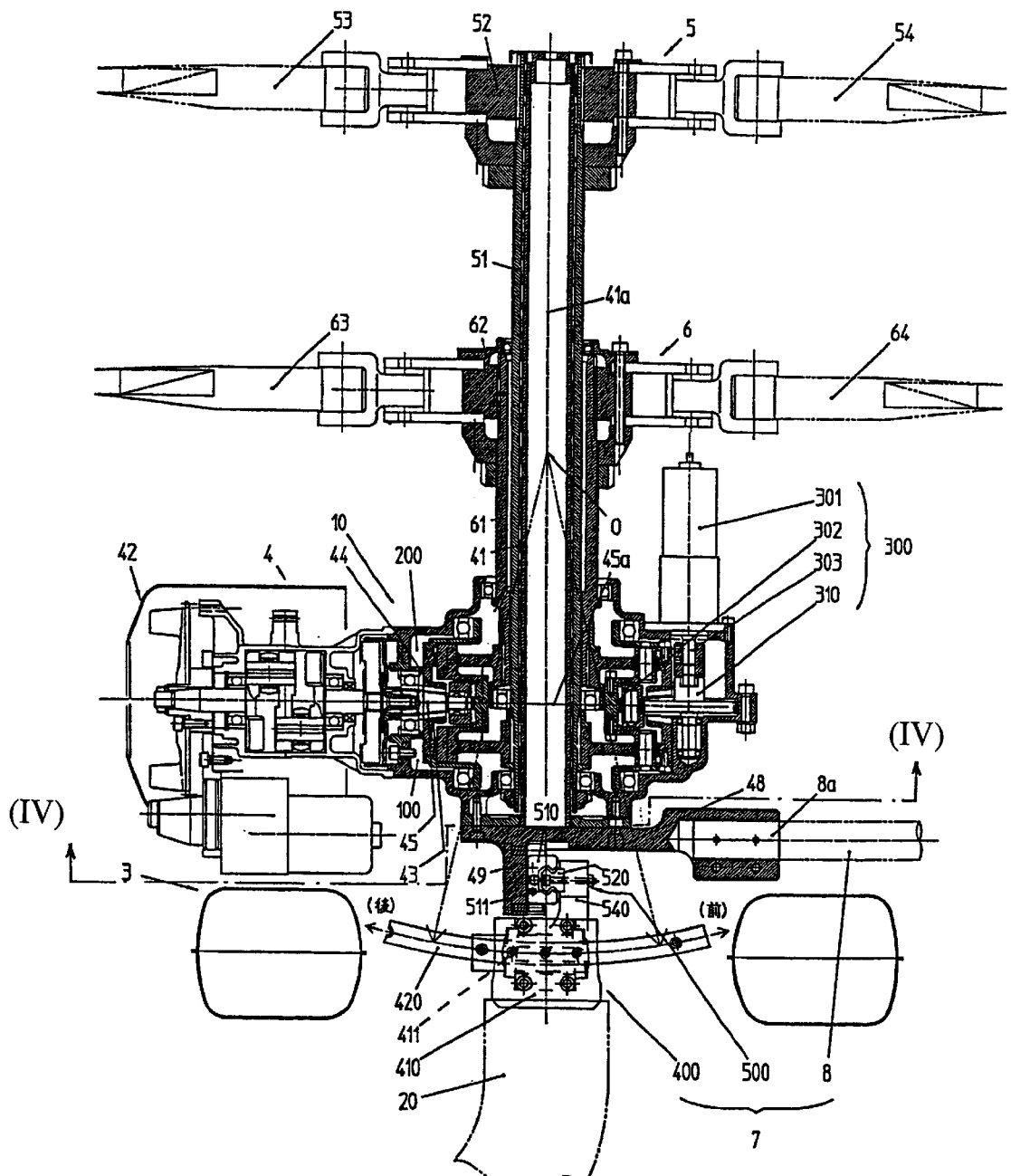
FIG. 2 is a partial cross-sectional view of the drive unit and control mechanism of the helicopter of FIG. 1.
Figure 3:
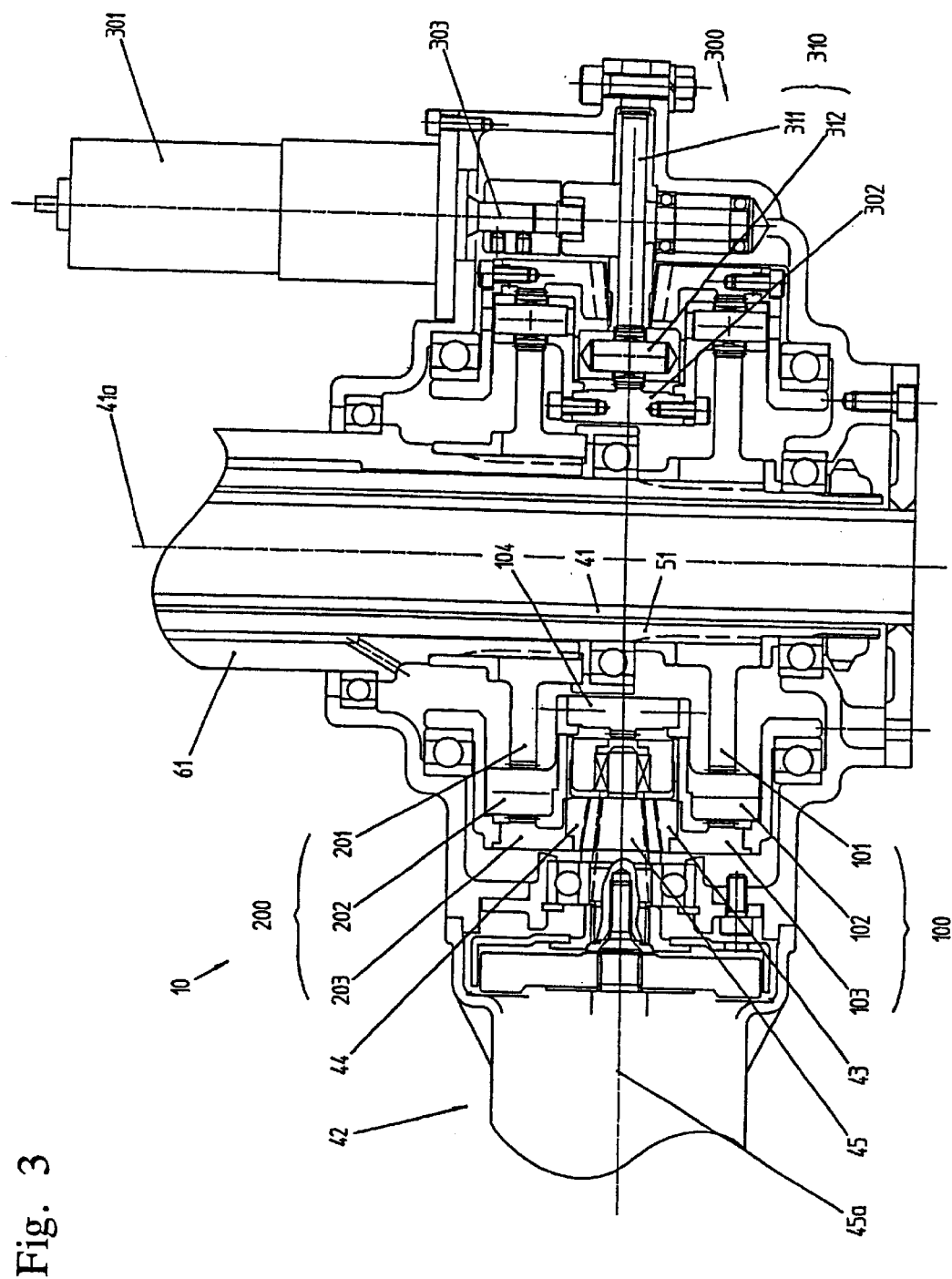
FIG. 3 is a partial cross-sectional view of the principal parts of the drive unit shown in FIG. 2.
Figure 4:
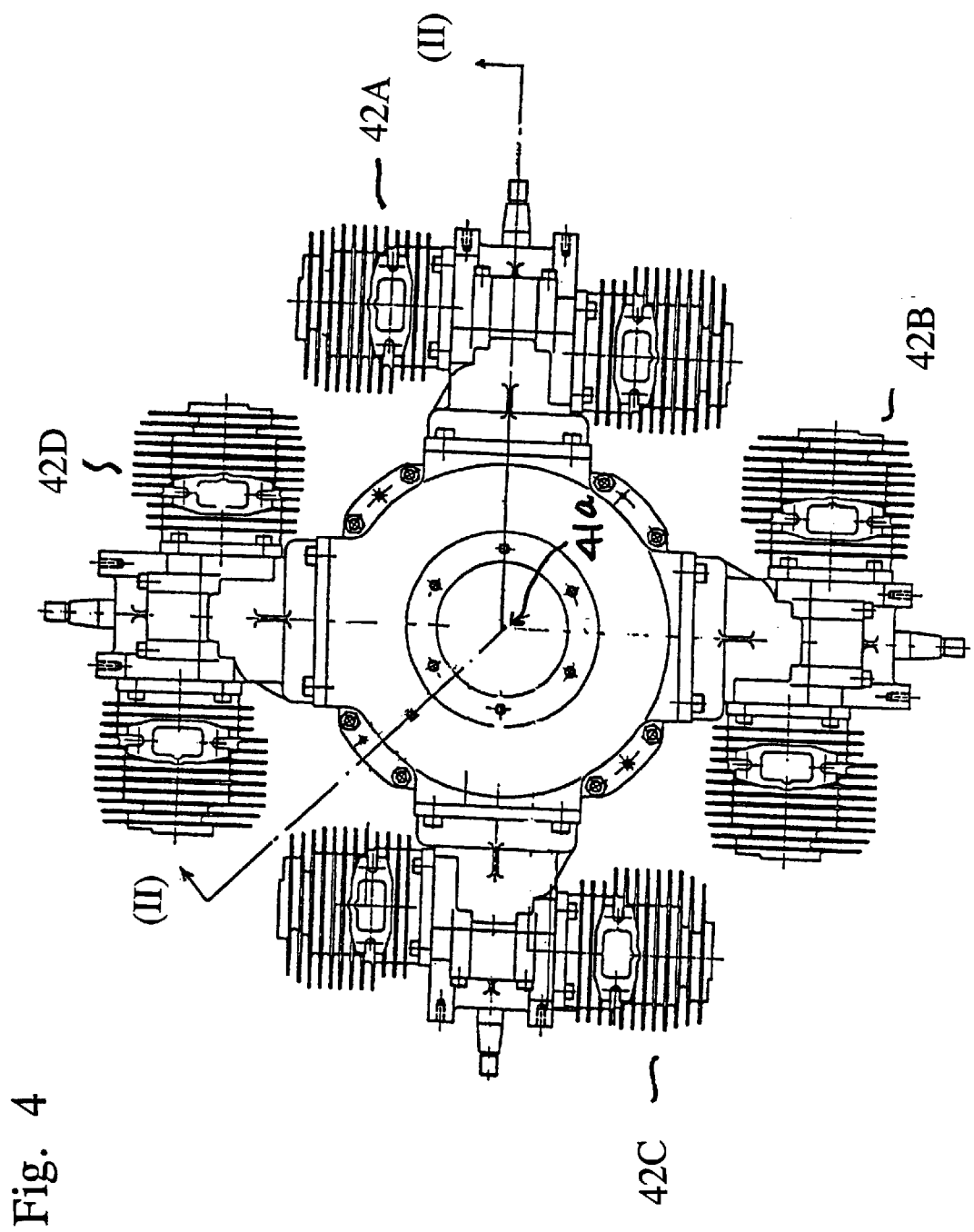
FIG. 4 is a diagram of a cross-section along line IV—IV of FIG. 2, viewed in the direction indicated by the arrows, to illustrate the attachment positions of the four engines of the helicopter of FIG. 1.

FIG. 2 shows parts of the drive unit 4 and control unit 7, FIG. 3 is an enlarged view of the drive unit 4, and FIG. 4 shows attachment positions of the four engines. The cross-sectional view of FIG. 2 is the cross-section along line II—II of FIG. 4.

Drive unit 4 will now be explained with reference to these drawings. The upper rotor 5 and lower rotor 6 include, respectively, hollow rotor shafts 51 and 61, rotor hubs 52 and 62 affixed to the outside of the rotor shafts 51 and 61, and pairs of blades 53, 54 and 63, 64 supported via hinge structures by the rotor hubs 52 and 62. The upper rotor shaft 51 is rotatably supported by a hollow vertical shaft 41 disposed coaxially inside the rotor shaft 51, and the lower rotor shaft 61 is rotatably supported in a coaxial state on the outside of the upper rotor shaft 51.

A drive transmission 10 for transmitting rotational force to the rotor shafts 51 and 61 is disposed at the lower end of the vertical shaft 41. The drive transmission 10 is used to transmit the rotational driving force output by the engine 42 to the rotor shafts 51 and 61 to drive the rotor shafts 51 and 61 in opposite directions at a uniform velocity.

The drive transmission 10 includes a first planet gear mechanism 100 disposed on the lower side of the drive transmission 10, and a second planet gear mechanism 200 disposed on the upper side. The first planet gear mechanism 100 includes a sun gear 101 attached coaxially to the outside surface of the upper rotor shaft 51 by a spline arrangement, a plurality of planetary gears 102 in meshed engagement with the sun gear 101, and an internal gear 103 in meshed engagement with the planetary gears 102. Similarly, the second planet gear mechanism 200 includes a sun gear 201 attached coaxially to the outside surface of the lower rotor shaft 61 by a spline arrangement, a plurality of planetary gears 202 in meshed engagement with the sun gear 201, and an internal gear 203 in meshed engagement with the planetary gears 202.

The planetary gears 102 and 202 are both carried by a cylindrical common carrier 104, with the planetary gears 202 of the first planet gear mechanism 100 being rotatably supported on the upper side and the planetary gears 102 of the second planet gear mechanism 200 being rotatably supported on the lower side. A crown gear 43 is attached to the annular upper end of the internal gear 103 and a crown gear 44 is attached to the annular lower end of the internal gear 203. The crown gears 43 and 44 are in meshed engagement with a drive pinion 45. The center of rotation 45a of the drive pinion 45 is at right-angles to the center of rotation 41a (the center axis of the vertical shaft 41) of the rotors. The drive pinion 45 is rotated by the rotational force transmitted from the engine 42.

FIG. 4 is a diagram of the cross-section along line IV—IV of FIG. 2, as viewed in the direction indicated by the arrows. As shown, in this embodiment there are four engines, numbered 42A to 42D. Each engine is coupled to a drive transmission 10 via a clutch mechanism (not shown). Each engine and clutch mechanism can be independently driven. Therefore, if one engine should break down and stop, the helicopter would still be able to continue to fly.

The transmission of the driving force by the drive transmission 10 will now be explained. When the drive pinion 45 is driven to rotate, the crown gears 43 and 44 are rotated, whereby the internal gears 103 and 203 are rotated at a uniform velocity in opposite directions about the center of rotation 41a. Via the planetary gears 102 and 202 rotatably supported by the common carrier 104, the rotation of the internal gears 103 and 203 is transmitted to the sun gears 101 and 201, respectively. Accordingly, the upper rotor shaft 51 connected to the sun gear 101 and the lower rotor shaft 61 connected to the sun gear 201 are rotated in opposite directions at a uniform velocity. Thus, during normal operation the upper and lower rotors 5 and 6 are rotated in opposite directions at a uniform velocity.

(Yaw Control Mechanism)

To control yaw, the drive unit 4 includes a yaw control mechanism. The yaw control mechanism 300 is a differential rotation generation mechanism that rotates the common carrier 104 of the first and second planetary gear mechanisms 100 and 200. The mechanism includes a motor 301, outer gear-wheel 302 formed on the outside surface of the common carrier 104, and a reduction gear-train 310 that connects output shaft 303 of the motor 301 with the outer gear-wheel 302. The reduction gear-train 310 includes a gear-wheel 311 linked to the motor output shaft 303 by a coupling, and a gear-wheel 312 in meshed engagement with the outer gear-wheel 302.

When the motor 301 is operated, the reduction gear-train 310 transmits the rotation of the output shaft 303 to the common carrier 104 to thereby rotate the common carrier 104 in a prescribed direction at a prescribed velocity. This produces a differential motion between the sun gears 101 and 201 of the first and second planet gear mechanisms 100 and 200, causing one sun gear to rotate faster than the other sun gear. Thus, the rotors 5 and 6 are driven in opposite directions at a velocity differential corresponding to the rotational velocity of the common carrier 104. This gives rise to a turning moment about the center or rotation 41a corresponding to the velocity differential, whereby the airframe 2 is turned about the center or rotation 41a in the direction of rotation of the slower rotor. Thus, the yaw of the airframe 2 can be controlled by provided switches and suchlike control means for controlling the speed and direction of rotation of the engine 42, and positioning such control means where they can be operated by the pilot.

(Control Unit)

The control unit 7 will now be explained, with reference to FIG. 2. The lift direction of the helicopter 1 is controlled by, with respect to the direction of gravitational force, tilting backward and forward and to either side the vertical shaft 41 that rotatably supports the rotors 5 and 6, thereby tilting the tips of the blades of the rotors 5 and 6. The control unit 7 comprises a fore-and-aft swing mechanism 400 that links the vertical shaft 41 to the airframe 20 so that the vertical shaft 41 can swing fore and aft within a prescribed angular range about a specified center point O on the center of rotation 41a, a right-and-left swing mechanism 500 that links the vertical shaft 41 to the airframe 20 so that the vertical shaft 41 can swing to either side (perpendicular to the drawing sheet, in the case of FIG. 2) within a prescribed angular range about the same center point O, and the control stick 8 used to tilt the vertical shaft 41 fore and aft or to either side.

The fore-and-aft swing mechanism 400 includes a slider 410 (first or second swing member) attached to the top of the airframe 20, and a guide-rail 420 that depends from the vertical shaft 41 via the right-and-left swing mechanism 500. The guide-rail 420 is a fixed-width rail formed in an arc centering on center point O. In the side of the slider 410 facing guide-rail 420, there is formed a rail groove 411 having a cross-section complementary to that of the guide-rail 420. The cross-sections of the guide-rail 420 and rail groove 411 are set to have the same shape as that of the illustrated cross-section of the right-and-left swing mechanism 500, so as not to come out of engagement to the left or right (normal to the drawing sheet). A direct-acting ball-bearing mechanism or the like can be used to ensure a smooth sliding motion by the slider 410.

The right-and-left swing mechanism 500 includes a slider 510 attached to a fixing portion 49 that projects downward from the lower surface of a horizontal flange 48 attached to the lower end of the vertical shaft 41, and a guide-rail 520 (second or first swing member). The guide-rail 520 is a fixed-width rail formed in an arc centering on center point O, extending perpendicularly, with respect to the drawing sheet (to the left and right of the airframe). In the side of the slider 510 facing guide-rail 520, there is formed a rail groove 511 having a cross-section complementary to that of the guide-rail 520. The cross-sections of the guide-rail 520 and the rail groove 511 are shaped so that disengagement does not occur in the fore-and-aft direction. The guide-rail 520 is attached to the top of an L-shaped bracket 540, and the guide-rail 420 is attached to the bottom end of the L-shaped bracket 540. A direct-acting ball-bearing mechanism or the like can be used to ensure a smooth sliding action by the slider 510.

Thus, between the horizontal flange 48 and the airframe 20, there are affixed, from the top, first the right-and-left swing mechanism 500 and then the fore-and-aft swing mechanism 400. The upper end 8a of the control stick 8 is attached to the edge of the flange 48 facing toward the front of the airframe. In the control unit 7 having the above configuration, the right-and-left swing mechanism 500 depending from the flange 48 can swing to the left and right, and the fore-and-aft swing mechanism 400 depending from the right-and-left swing mechanism 500 can swing fore and aft.

When the pilot moves the control stick 8 forward or backward, or to the left or right, the vertical shaft 41 is tilted in the same direction. Since the rotors 5 and 6 are attached to the vertical shaft 41, the rotors 5 and 6 are also tilted with respect to the horizontal plane, thereby enabling the direction in which the helicopter moves to be controlled. If the control force acting on the control stick 8 is removed, the force of gravity automatically brings the vertical shaft 41 back to the vertical (in alignment with the direction in which the gravitational force acts), and the helicopter starts hovering again.

While the right-and-left swing mechanism 500 has been described as being on the upper side and the fore-and-aft swing mechanism 400 on the lower side, it is to be understood that the positions of the mechanisms may be reversed.

As described above, the coaxial twin-rotor type helicopter of this embodiment is controlled by using suspended type right-and-left and fore-and-aft swing mechanisms. This enables the force of gravity to be used to bring the rotors back to the horizontal, making it a simpler and more compact control system than conventional arrangements, and suitable for application to a small, one-man helicopter.

Also, in accordance with the invention the drive transmission mechanism used includes first and second planet gear mechanisms provided with a common carrier, a drive pinion and sun gears that rotate internal gears in the first and second planet gear mechanisms in opposite directions at a uniform velocity, in addition to which, the motor is used to rotate the common carrier in a prescribed direction to generate a differential motion between the first and second planet gear mechanisms that is utilized to control yaw. Thus, a yaw control mechanism is realized that is simpler and more compact than conventional arrangements, making it suitable for application to a small, one-man helicopter.

Second Embodiment

FIGS. 5 and 6 show general and cross-sectional views of a coaxial twin-rotor type helicopter according to a second embodiment of the invention. With reference to the figures, a helicopter 601 comprises an airframe 602, a drive unit 605 on the top of the airframe 602, said drive unit 605 having two engines 603 and 604, an inner rotor shaft 606 and an outer rotor shaft 607 that are coaxial and driven in opposite directions by the drive unit 605, an upper rotor 608 attached to the inner rotor shaft 606 and a lower rotor 609 attached to the outer rotor shaft 607.

Around the outer periphery of the rotors 608 and 609, the helicopter 601 also has a protective frame 610 attached to the airframe 602. The protective frame 610 is constructed of light metal piping or plastic piping, and comprises large and small circular pipes 611 and 612 positioned coaxially on the upper side of the protective frame 610, large and small circular pipes 613 and 614 positioned coaxially on the lower side of the protective frame 610, radially horizontal pipes 621 to 624 linking the circular pipes 611 and 612, radially horizontal pipes 631 to 634 linking the circular pipes 613 and 614, vertical pipes 641 to 644 linking the large-diameter pipes 611 and 613, and vertical pipes 651 to 654 extending downward from a mid-point position on the pipes 631 to 634.

In the example of this embodiment, the protective frame 610 has a circular, perforated plate 660 disposed around the outer circumference of the circular pipes 611 and 613. The perforated plate 660 may be formed of fiber-reinforced plastic, for example. In the example of this embodiment, moreover, an air tube 670 is disposed around the circumference of the perforated plate 660.

In the helicopter 601 thus configured, the protective frame 610 around the rotors 608 and 609 serve to protect persons working on the ground from injury through contact with the rotors when the helicopter is flying or hovering low. The protective frame 610 also serves to prevent electric power lines and the like being cut by the rotors. In the event that the helicopter 601 does hit a person or the like, the air tube 670 around the periphery will protect the person from the shock of the impact. In addition, the air tube covering the perforated plate around the outside of the rotors 608 and 609 also has the effect of increasing lift by promoting the formation of upward air currents.

While this embodiment has been described with reference to a perforated plate and air tube around the outer periphery of the airframe, the required effect is also obtained when just the protective frame is used. Similarly, the required effect is also obtained by using just the protective frame and the perforated plate.

The protective frame, perforated plate and air tube may be formed of any material that is light and has the necessary durability and strength. Also, while reference was made to a perforated plate formed of plastic, netting or punched metal may be used instead.

This embodiment relates to a helicopter intended to be remotely controlled. However, the protective frame, perforated plate and air tube can also be applied to a manned helicopter such as the one-man helicopter of the first embodiment.

What is claimed is:

1. A coaxial twin-rotor type helicopter in which an upper rotor and a lower rotor disposed on the same axis are rotated in opposite directions, said helicopter comprising:

an airframe, a vertical shaft that rotatably supports the rotors, and a control mechanism that, with respect to a gravitational force direction, can tilt the vertical shaft backward and forward and to either side to thereby tilt tips of blades of the rotors; wherein the control mechanism has a first slider attached to a lower end portion of the vertical shaft, a first guide-rail formed in an arc centering on a swing center point on a center axis of the vertical shaft so that the first guide rail is freely swingable along the first slider backward and forward or to either side about the swing center point, a second slider attached to a top of the airframe, a second guide-rail that depends from the first guide-rail and is formed in an arc centering on the swing center point, extending perpendicularly, with respect to the first guide-rail, so that the second slider is freely swingable along said second guide-rail about the swing center point in a direction at right-angles to the swinging direction of the first slider, and a control stick that can swing the vertical shaft backward and forward and to either side.

2. A coaxial twin-rotor type helicopter in which an upper rotor and a lower rotor disposed on the same axis are rotated in opposite directions, said helicopter comprising:

an airframe, a vertical shaft that rotatably supports the rotors, and a control mechanism that, with respect to a gravitational force direction, can tilt the vertical shaft backward and forward and to either side to thereby tilt tips of blades of the rotors, and a drive transmission mechanism to rotate the twin rotors, said control mechanism comprising a first swing member that depends from a lower end portion of the vertical shaft so as to be freely swingable backward and forward or to either side about a swing center point on a center axis of the vertical shaft, a second swing member that depends from the first swing member so as to be freely swingable about the swing center point in a direction at right-angles to the swinging direction of the first swing member, and a control stick that can swing the vertical shaft backward and forward and to either side, and said drive transmission mechanism comprising first and second planet gear mechanisms, crown gears attached so that centers of rotation thereof are at right-angles with respect to internal gears of the first and second planet gear mechanisms, and a drive pinion in meshed engagement with both crown gears;

wherein the first and second planet gear mechanisms are provided with a common carrier, a sun gear in the first planet gear mechanism is connected to rotate integrally with the upper rotor shaft, and a sun gear in the second planet gear mechanism is connected to rotate integrally with the lower rotor shaft.

3. A coaxial twin-rotor type helicopter according to claim 2, wherein the control mechanism includes a yaw control mechanism, said yaw control mechanism including a differential rotation generator that rotates the common carrier of the first and second planet gear mechanisms, said differential rotation generator comprising a motor, an outer gear-wheel formed on an outer face of the common carrier, and a reduction gear-train disposed between a motor output shaft and the outer gear-wheel.

4. A coaxial twin-rotor type helicopter in which an upper rotor and a lower rotor disposed on the same axis are rotated in opposite directions, said helicopter including a drive transmission mechanism for rotating the twin rotors, the drive transmission mechanism comprising first and second planet gear mechanisms, crown gears attached so that centers of rotation thereof are at right-angles with respect to internal gears of the first and second planet gear mechanisms, and a drive pinion in meshed engagement with both crown gears;

the first and second planet gear mechanisms are provided with a common carrier, a sun gear in the first planet gear mechanism is connected to rotate integrally with the upper rotor shaft, and a sun gear in the second planet gear mechanism is connected to rotate integrally with the lower rotor shaft, and a yaw control mechanism comprising a differential rotation generator that rotates the common carrier of the first and second planet gear mechanisms, said differential rotation generator including a motor, an outer gear-wheel formed on an outer face of the common carrier, and a reduction gear-train disposed between a motor output shaft and the outer gear-wheel.

* * * * *